Figure 1:
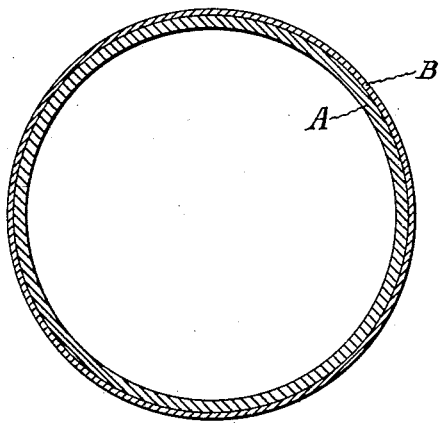
Figure 2:
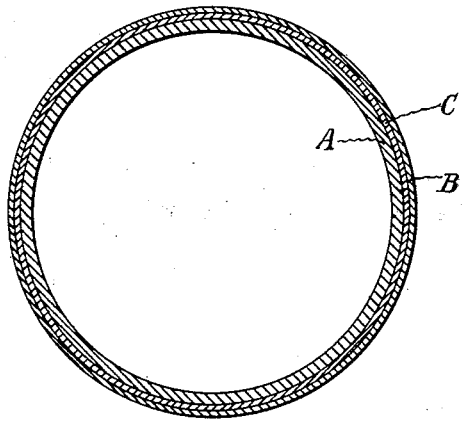

No. 702,869. Patented June 17, 1902.
A. T. COLLIER.
AIR TUBE FOR PNEUMATIC TIRES.
(Application filed Apr. 15, 1902.)
(No Model.)

Witnesses:

Inventor
Arthur T. Collier
By
James L. Norris
Atty.

UNITED STATES PATENT OFFICE.

ARTHUR THOMAS COLLIER, OF ST. ALBANS, ENGLAND, ASSIGNOR OF ONE-HALF TO EDGAR OLIVER GOSS AND ARNOLD ELWORTHY WILLIAMS, OF LONDON, ENGLAND.

AIR-TUBE FOR PNEUMATIC TIRES.

SPECIFICATION forming part of Letters Patent No. 702,869, dated June 17, 1902.

Application filed April 15, 1902. Serial No. 103,040. (No specimens.)

*To all whom it may concern:*

Be it known that I, ARTHUR THOMAS COLLIER, a subject of the King of Great Britain, residing at St. Albans, England, have invented certain new and useful Improvements Relating to Air-Tubes for Pneumatic Tires, of which the following is a specification.

It is well known that an india-rubber tube for pneumatic tires cured with salts or compounds of antimony (a so-called "red-rubber" tube) is much stronger and tougher than a rubber tube cured with sulfur or other vulcanizing agents, (a so-called "gray-rubber" tube.) A rubber air-tube cured with antimony compounds, however, possesses the disadvantage that it cannot be so readily patched or repaired when punctured as a rubber tube which does not contain antimony.

By my invention I construct an air-tube of several layers of rubber, the first or inner layer or layers containing antimony compounds and the next or outer layer or layers containing sulfur or other vulcanizing agents, the several layers being preferably produced by wrapping. The tube thus constructed is then vulcanized, and the several layers of rubber are thoroughly baked together and form one solid tube. In some cases I insert between the inner layer or layers containing antimony compounds and the outer layer or layers containing sulfur or other vulcanizing agents one or more neutral layers of rubber which do not contain any vulcanizing agent whatever. During the subsequent process of vulcanization the antimony compounds of the inner layers and the sulfur or other vulcanizing agents of the outer layers permeate, however, to some extent the rubber of the neutral layer or layers and sufficiently cure it. The neutral layer or layers are interposed in order to prevent the antimony compounds of the inner layers from permeating the outer layers during vulcanization and at the same time to prevent the sulfur of the outer layers from permeating the inner layers. The curing or vulcanizing agents above referred to are employed in the manner well known in the art to which this invention relates, the antimony compound or salt being usually the pentasulfid. The several layers of rubber may, in addition to the vulcanizing agents mentioned above, contain any other ingredients which are usually mixed with rubber.

A rubber air-tube for pneumatic tires constructed according to my invention combines the advantages of an antimony-cured tube as regards toughness with the advantages of a sulfur-cured tube as regards facility of repairing and is better adapted for use in a pneumatic tire than a tube cured throughout either with antimony or with sulfur or other vulcanizing agents.

What I claim is—

1. In an air-tube for a pneumatic tire, the combination of an inner layer of india-rubber, cured with an antimony compound and an outer layer cured with sulfur, substantially as, and for the purpose specified.

2. In an air-tube for a pneumatic tire, the combination of an inner layer of india-rubber cured with an antimony compound, an outer layer cured with sulfur, and an intermediate layer acted upon by the curing agents from the said inner and outer layers, substantially as, and for the purpose hereinbefore described.

In testimony whereof I have hereunto set my hand in presence of two subscribing witnesses.

ARTHUR THOMAS COLLIER.

Witnesses:
 GEO. HARRISON,
 CONRAD K. FALKENSTEIN.